United States Patent
Rubin et al.

(10) Patent No.: US 10,714,096 B2
(45) Date of Patent: *Jul. 14, 2020

(54) DETERMINING HOTWORD SUITABILITY

(71) Applicant: Google LLC, Mountain View, CA (US)

(72) Inventors: Andrew Rubin, Portola Valley, CA (US); Johan Schalkwyk, Scarsdale, NY (US); Maria Carolina Parada San Martin, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 60 days.

This patent is subject to a terminal disclaimer.

(21) Appl. No.: 15/981,376

(22) Filed: May 16, 2018

(65) Prior Publication Data

US 2018/0336906 A1    Nov. 22, 2018

Related U.S. Application Data

(63) Continuation of application No. 15/002,044, filed on Jan. 20, 2016, now Pat. No. 10,002,613, which is a
(Continued)

(51) Int. Cl.
*G10L 15/00* (2013.01)
*G10L 17/24* (2013.01)
(Continued)

(52) U.S. Cl.
CPC .............. *G10L 17/24* (2013.01); *G06F 21/32* (2013.01); *G06F 21/46* (2013.01); *G10L 15/06* (2013.01);
(Continued)

(58) Field of Classification Search
CPC ... G10L 15/22; G10L 2015/088; G10L 15/30; G10L 15/32; G10L 17/22;
(Continued)

(56) References Cited

U.S. PATENT DOCUMENTS

| 5,732,395 | A | | 3/1998 | Silverman |
| 5,754,977 | A | * | 5/1998 | Gardner ............... G06K 9/6255 704/231 |

(Continued)

FOREIGN PATENT DOCUMENTS

| CN | 101558442 | 10/2009 |
| EP | 1884923 | 2/2008 |

(Continued)

OTHER PUBLICATIONS

Anguita, Jan / Peillon, Stephane / Hernando, Javier / Bramoulle, Alexandre (2004): "Word confusability prediction in automatic speech recognition", In INTERSPEECH—2004, 1489-1492. (Year: 2004).*

(Continued)

*Primary Examiner* — Michael Ortiz-Sanchez
(74) *Attorney, Agent, or Firm* — Honigman LLP; Brett A. Krueger; Grant Griffith (57) ABSTRACT

Methods, systems, and apparatus, including computer programs encoded on a computer storage medium, for determining hotword suitability. In one aspect, a method includes receiving speech data that encodes a candidate hotword spoken by a user, evaluating the speech data or a transcription of the candidate hotword, using one or more predetermined criteria, generating a hotword suitability score for the candidate hotword based on evaluating the speech data or a transcription of the candidate hotword, using one or more predetermined criteria, and providing a representation of the hotword suitability score for display to the user.

21 Claims, 4 Drawing Sheets

Related U.S. Application Data continuation of application No. 13/567,572, filed on Aug. 6, 2012, now Pat. No. 9,536,528.

(60) Provisional application No. 61/667,817, filed on Jul. 3, 2012.

(51) Int. Cl.

| | |
|---|---|
| *G06F 21/32* | (2013.01) |
| *G10L 25/51* | (2013.01) |
| *G06F 21/46* | (2013.01) |
| *G10L 15/22* | (2006.01) |
| *G10L 15/06* | (2013.01) |
| *G10L 15/08* | (2006.01) |

(52) U.S. Cl.
CPC .............. *G10L 15/08* (2013.01); *G10L 15/22* (2013.01); *G10L 25/51* (2013.01); *G10L 2015/0638* (2013.01); *G10L 2015/088* (2013.01); *G10L 2015/225* (2013.01)

(58) Field of Classification Search
CPC ........... G10L 2015/0638; G10L 15/063; G06F 3/167; G06F 16/3344; G06F 17/2775; G06F 2203/0381; G06F 16/90332; G06F 17/278

See application file for complete search history.

(56) References Cited

U.S. PATENT DOCUMENTS

| | | | |
|---|---|---|---|
| 6,073,096 A | 6/2000 | Goa et al. | |
| 6,134,527 A | 10/2000 | Meurier et al. | |
| 6,289,140 B1 | 9/2001 | Oliver | |
| 6,295,391 B1 | 9/2001 | Rudd | |
| 6,363,348 B1 | 3/2002 | Besling et al. | |
| 6,415,257 B1 | 7/2002 | Junqua | |
| 6,654,734 B1 | 11/2003 | Mani et al. | |
| 6,748,361 B1 | 6/2004 | Comerford et al. | |
| 6,965,786 B2 | 11/2005 | Qu et al. | |
| 7,013,282 B2 | 3/2006 | Schrocter | |
| 7,099,825 B1 | 8/2006 | Cook | |
| 7,212,613 B2 | 5/2007 | Kim | |
| 7,349,896 B2 | 3/2008 | Chowdhury et al. | |
| 7,363,228 B2 | 4/2008 | Wyss et al. | |
| 7,386,448 B1 | 6/2008 | Poss | |
| 7,412,391 B2 | 8/2008 | Nakagawa et al. | |
| 7,712,031 B2 | 5/2010 | Law | |
| 7,877,258 B1 | 1/2011 | Chelba et al. | |
| 7,934,101 B2 | 4/2011 | Stieglitz et al. | |
| 8,370,146 B1 | 2/2013 | Schalkwyk et al. | |
| 8,380,521 B1 | 2/2013 | Maganti et al. | |
| 8,407,239 B2 | 3/2013 | Dean et al. | |
| 8,548,812 B2 | 10/2013 | Whynot | |
| 8,676,904 B2 | 3/2014 | Lindahl | |
| 8,682,661 B1 | 3/2014 | Schalkwyk et al. | |
| 8,719,039 B1 | 5/2014 | Sharifi | |
| 8,768,712 B1 | 7/2014 | Sharifi | |
| 8,924,219 B1 | 12/2014 | Bringert et al. | |
| 9,031,847 B2 | 5/2015 | Sarin | |
| 9,117,449 B2 | 8/2015 | Newman et al. | |
| 9,123,330 B1 | 9/2015 | Sharifi | |
| 9,263,042 B1 | 2/2016 | Sharifi | |
| 9,275,637 B1* | 3/2016 | Salvador .................. G10L 15/01 | |
| 9,378,733 B1 | 6/2016 | Vanhoucke | |
| 9,548,047 B2 | 1/2017 | Clark et al. | |
| 2001/0047263 A1 | 11/2001 | Smith | |
| 2002/0116196 A1 | 8/2002 | Tran | |
| 2002/0181691 A1 | 12/2002 | Miller et al. | |
| 2002/0193989 A1 | 12/2002 | Geilhufe et al. | |
| 2003/0069729 A1 | 4/2003 | Bickley et al. | |
| 2003/0125944 A1 | 7/2003 | Wohlsen | |
| 2003/0171929 A1 | 9/2003 | Falcon | |
| 2003/0212562 A1 | 11/2003 | Patel et al. | |
| 2003/0236664 A1 | 12/2003 | Sharma | |
| 2004/0024745 A1 | 2/2004 | Jeng et al. | |
| 2004/0250139 A1 | 12/2004 | Hurley | |
| 2005/0033582 A1 | 2/2005 | Gadd et al. | |
| 2005/0102259 A1 | 5/2005 | Kapur | |
| 2005/0203740 A1 | 9/2005 | Chambers et al. | |
| 2005/0235341 A1 | 10/2005 | Stieglitz et al. | |
| 2005/0283764 A1 | 12/2005 | Chiu et al. | |
| 2006/0064177 A1 | 3/2006 | Tian et al. | |
| 2006/0085183 A1 | 4/2006 | Jain | |
| 2007/0081636 A1 | 4/2007 | Shaffer | |
| 2007/0094033 A1 | 4/2007 | Nagashima et al. | |
| 2007/0100636 A1 | 5/2007 | Hirota et al. | |
| 2007/0135187 A1 | 6/2007 | Kreiner et al. | |
| 2007/0143117 A1 | 6/2007 | Conley | |
| 2008/0058023 A1 | 3/2008 | Seshadri et al. | |
| 2008/0059186 A1 | 3/2008 | Mowatt | |
| 2008/0059188 A1 | 3/2008 | Konopka et al. | |
| 2008/0133245 A1 | 6/2008 | Proulx et al. | |
| 2008/0140397 A1 | 6/2008 | Millman et al. | |
| 2008/0165937 A1 | 7/2008 | Moore | |
| 2008/0201306 A1 | 8/2008 | Cooper et al. | |
| 2008/0208585 A1 | 8/2008 | Ativanichayaphong et al. | |
| 2008/0215577 A1* | 9/2008 | Takagi .................. G06F 17/278 | |
| 2008/0270135 A1 | 10/2008 | Goel et al. | |
| 2008/0300886 A1 | 12/2008 | Patch | |
| 2009/0006264 A1 | 1/2009 | Schultz | |
| 2009/0143057 A1 | 6/2009 | Arun et al. | |
| 2009/0171659 A1 | 7/2009 | Pearce et al. | |
| 2009/0171663 A1 | 7/2009 | Badt et al. | |
| 2009/0171664 A1 | 7/2009 | Kennewick et al. | |
| 2009/0210233 A1 | 8/2009 | Thompson et al. | |
| 2009/0215503 A1 | 8/2009 | Zhang et al. | |
| 2009/0216538 A1 | 8/2009 | Weinberg et al. | |
| 2009/0299751 A1 | 12/2009 | Jung | |
| 2009/0318085 A1 | 12/2009 | Seshadri et al. | |
| 2009/0319270 A1 | 12/2009 | Gross | |
| 2010/0106502 A1 | 4/2010 | Farrell | |
| 2010/0144439 A1 | 6/2010 | Watanabe et al. | |
| 2010/0161335 A1 | 6/2010 | Whynot | |
| 2010/0169075 A1* | 7/2010 | Raffa .................. G06F 17/2775 704/9 |
| 2010/0286985 A1 | 11/2010 | Kennewick et al. | |
| 2010/0312782 A1 | 12/2010 | Li et al. | |
| 2011/0035220 A1 | 2/2011 | Opaluch | |
| 2011/0060587 A1 | 3/2011 | Phillips et al. | |
| 2011/0066634 A1 | 3/2011 | Phillips | |
| 2011/0106534 A1 | 5/2011 | LeBeau et al. | |
| 2011/0131045 A1 | 6/2011 | Cristo et al. | |
| 2011/0196668 A1 | 8/2011 | Shu et al. | |
| 2011/0275348 A1 | 11/2011 | Clark | |
| 2013/0173268 A1 | 7/2013 | Weng | |
| 2013/0177143 A1 | 7/2013 | Zhou | |
| 2013/0227651 A1 | 8/2013 | Schultz | |
| 2014/0006825 A1 | 1/2014 | Shenhav | |
| 2014/0012586 A1 | 1/2014 | Rubin et al. | |
| 2014/0122085 A1 | 5/2014 | Piety | |
| 2014/0122087 A1 | 5/2014 | Macho | |
| 2014/0222436 A1 | 8/2014 | Binder | |
| 2014/0278435 A1 | 9/2014 | Ganong et al. | |
| 2014/0330563 A1 | 11/2014 | Faians | |
| 2014/0358543 A1 | 12/2014 | Chino | |
| 2015/0019220 A1 | 1/2015 | Talhami et al. | |
| 2015/0112684 A1 | 4/2015 | Scheffer | |
| 2015/0127337 A1 | 5/2015 | Heigold | |
| 2015/0243283 A1 | 8/2015 | Halash | |
| 2015/0294670 A1 | 10/2015 | Roblek | |
| 2015/0301796 A1 | 10/2015 | Visser | |
| 2016/0148613 A1 | 5/2016 | Kwon | |
| 2016/0189730 A1 | 6/2016 | Du | |
| 2016/0293168 A1 | 10/2016 | Chen | |

FOREIGN PATENT DOCUMENTS

| | | |
|---|---|---|
| KR | 20100068530 | 6/2010 |
| KR | 20150022786 | 3/2015 |

(56) References Cited

FOREIGN PATENT DOCUMENTS

| WO | WO 2008148659 | 12/2008 |
|---|---|---|
| WO | WO 2013053798 | 4/2013 |

OTHER PUBLICATIONS

KR Office Action in Korean Appln No. 10-2015-7002936, dated May 9, 2019, 19 pages.
"Siri. Your wish is its command." Downloaded from the internet on Aug. 6, 2012, http://www.apple.com/iphone/features/siri.html, 4 pages.
Ahmed et al., "Training Hierarchical Feed-Forward Visual Recognition Models Using Transfer Learning from Pseudo-Tasks," ECCV 2008, Part III, LNCS 5304, 2008, 14 pages.
Anguita, Jan et al., "Word Confusability Prediction in Automatic Speech Recognition," Proceedings of the International Conference on Spoken Language Processing (Interspeech), Oct. 4, 2004, 4 pages.
Bengio, "Deep Learning of Representations for Unsupervised and Transfer Learning," JMLR: Workshop and Conference Proceedings 27, 2012, 21 pages.
Caruana, "Multitask Learning," CMU-CS-97-203 paper, School of Computer Science, Carnegie Mellon University, Sep. 23, 1997, 255 pages.
Caruana, "Multitask Learning," Machine Learning, 28, 1997, 35 pages.
Chen et al., "Small-footprint keyword spotting using deep neural networks," in Proceedings of IEEE International conference on Acoustics, Speech and Signal Processing (ICASSP), May 2014, 5 pages.
Christiansen, Richard W. et al., "Detecting and Locating Key Words in Continuous Speech Using Linear Predictive Coding," IEEE Transactions on Acoustics on Speech and Processing, vol. ASSP 25, No. 5, Oct. 30, 1977, 7 pages.
Ciresan et al., "Transfer learning for Latin and Chinese characters with Deep Neural Networks," The 2012 International Joint Conference on Neural Networks (IJCNN), Jun. 10-15, 2012, 1-6 (abstract only), 2 pages.
Collobert et al., "A Unified Architecture for Natural Language Processing: Deep Neural Networks with Multitask Learning," Proceedings of the 25$^{th}$ International Conference on Machine Learning, Helsinki, Finland, 2008, 8 pages.
Dahl et al., "Large Vocabulary Continuous Speech Recognition with Context-Dependent DBN-HMMS," IEEE, May 2011, 4 pages.
Dean et al., "Large Scale Distributed Deep Networks," Advances in Neural Information Processing Systems 25, 2012, 11 pages.
Extended European Search Report issued in European Application No. 17198918.9 , dated Feb. 1, 2018, 11 pages.
Extended European Search Report issued in European Application No. 17198899.1, dated Feb. 15, 2018, 11 pages.
Fernandez et al., "An application of recurrent neural networks to discriminative keyword spotting," ICANN'07 Proceedings of the 17th international conference on Artificial neural networks, 2007, 10 pages.
Grangier et al., "Discriminative Keyword Spotting," Speech and Speaker Recognition: Large Margin and Kernel Methods, 2001, 23 pages.
Heigold et al., "Multilingual Acoustic Models Using Distributed Deep Neural Networks," 2013 IEEE International Conference on Acoustics, Speech and Signal Processing (ICASSP), May 26-31, 2013, 5 pages.
Huang et al., "Cross-language knowledge transfer using multilingual deep neural network with shared hidden layers", in Proc. ICASSP, 2013, 5 pages.
Hughes et al., "Recurrent Neural Networks for Voice Activity Detection," ICASSP 2013, IEEE 2013, 5 pages.
International Preliminary Report on Patentability in International Application No. PCT/US2013/048945, dated Jan. 6, 2015, 12 pages.

Jaitly et al., "Application of Pretrained Deep Neural Networks to Large Vocabulary Conversational Speech Recognition," Department of Computer Science, University of Toronto, UTML TR 2012-001, Mar. 12, 2012, 11 pages.
Jiang et al., "Subword-Dependent Speaker Clustering for Improved Speech Recognition," INTERSPEECH, XP007010404, Oct. 16, 2000, 4 pages.
Kepuska, V. and Breitfeller, J., Wake-up-word application for first responder communication enhancement, Proc. SPIE 6201, pp. 62011E, 2006, 7 pages.
Kepuska, V.Z. and Klein, T.B., A novel Wake-Up-Word speech recognition system, Wake-Up-Word recognition task, echnology and evaluation, Nonlinear Analysis: Theory, Methods & Applications, vol. 71, Issue 12, Dec. 15, 2009, pp. e2772-e2789, ISSN 0362-546X, 10.1016/j.na.2009.06.089.
Kepuska, Veton (2011). Wake-Up-Word Speech Recognition, Speech Technologies, Prof. Ivo lpsic (Ed.), ISBN: 978-953-307-996-7, InTech, Available from: http://www.intechopen.com/books/speech-technologies/wake-upword- speech-recognition, 26 pages.
Le et al., "Building High-level Features Using Large Scale Unsupervised Learning," Proceedings of the 29$^{th}$ International Conference on Machine Learning, Jul. 12, 2012, 11 pages.
Lei et al., "Accurate and Compact Large Vocabulary Speech Recognition on Mobile Devices," INTERSPEECH 2013, Aug. 25-29, 2013, 4 pages.
Li et al., "A Whole Word Recurrent Neural Network for Keyword Spotting," IEEE 1992, 4 pages.
'LumenVox.com' [online] "Grammars," Nov. 25, 2010, [retrieved via the Wayback machine]http://www.lumenvox.com/pdf/grammars.pdf, 9 pages.
Mamou et al., "Vocabulary Independent Spoken Term Detection," SIGIR'07, Jul. 23-27, 2007, 8 pages.
Miller et al., "Rapid and Accurate Spoken Term Detection," INTERSPEECH 2007, Aug. 27-31, 2007, 4 pages.
Notification of Transmittal of the International Search Report and the Written Opinion of the International Searching Authority, or the Declaration, issued in PCT/US2013/048945 on Oct. 24, 2013, 17 pages.
Office Action issued in Chinese Application No. 201380043134.5, dated Jan. 26, 2017, 9 pages
Office Action issued in U.S. Appl. No. 13/567,572 dated Nov. 16, 2012, 23 pages.
Office Action received in U.S. Appl. No. 13/567,572 dated Jun. 6, 2013, 20 pages.
Office Action issued in European Application No. 13739887.1, dated Feb. 1, 2018, 7 pages.
Padmanabhan et al., "Speaker Clustering and Transformation for Speaker Adaptation in Speech Recognition Systems," IEEE Transactions on Speech and Audio Processing, IEEE Service Center, vol. 6, No. 1, XP011054285, Jan. 1, 1998, 7 pages.
Parlak et al., "Spoken Term Detection for Turkish Broadcast News," ICASSP, IEEE, 2008, 4 pages.
Prabhavalkar et al., "Automatic gain control and multi-style training for robust small-footprint keyword spotting with deep neural networks," in Proceedings of IEEE International Conference on Acoustics, Speech and Signal Processing (ICASSP), (to appear), 2015, 5 pages.
Roe, David B. et al., "Prediction of Word Confusabilities for Speech Recognition," International Conference on Spoken Language Processing (ICSLP), vol. 1, Sep. 18, 1994, 4 pages.
Rohlicek et al., "Continuous Hidden Markov Modeling for Speaker-Independent Word Spotting," IEEE 1989, 4 pages.
Rose et al., "A Hidden Markov Model Based Keyword Recognition System," IEEE 1990, 4 pages.
Schalkwyk et al., "Google Search by Voice: A case study," Advances in Speech Recognition. Springer US, 2010, 35 pages.
Science Net [online]. "Deep Learning workshop ICML 2013, " Oct. 29, 2013 [retrieved on Jan. 24, 2014]. Retrieved from the internet: URL<http://blog.sciencenet.cn/blog-701243-737140.html>, 13 pages.
Shekofteh, Yasser et al., "Confidence Measure Improvement Using Predictor Features an Support Vector Machines," IEEE 20$^{th}$ Iranian Conference on Electrical Engineering (ICEE), May 15, 2012, 4 pages.

(56) References Cited

OTHER PUBLICATIONS

Silaghi et al., "Iterative Posterior-Based Keyword Spotting Without Filler Models," IEEE 1999, 4 pages.
Silaghi, "Spotting Subsequences matching a HMM using the Average Observation Probability Criteria with application to Keyword Spotting," American Association for Artificial Intelligence, 1118-1123, 2005, 5 pages.
Srivastava et al., "Discriminative Transfer Learning with Tree-based Priors," Advances in Neural Information Processing Systems 26 (NIPS 2013), 12 pages.
Sutton et al., "Composition of Conditional Random Fields for Transfer Learning," In Proceedings of HLT/EMNLP, 2005, 7 pages.
Swietojanski et al., "Unsupervised cross-lingual knowledge transfer in DNN-based LVCSR," In Proc. IEEE Workshop on Spoken Language Technology, Miami, Florida, USA, Dec. 2012, 6 pages.
Tabibian et al., "An Evolutionary based discriminative system for keyword spotting," IEEE, 2011, 6 pages.
Taylor, P.A. "Concept-to-Speech Synthesis by Phonological Structure Matching." Center for Speech Technology Research, University of Edinburgh; The Royal Society, Apr. 15, 2000, 14 pages.
Variani et al., "Deep neural networks for small footprint text-dependent speaker verification," 2014 IEEE International Conference on Acoustics, Speech and Signal Processing (ICASSP '14), 2014, 5 pages.
Weintraub, "Keyword-Spotting Using SRI'S DECIPHER™ Large-Vocabuarly Speech-Recognition System," IEEE 1993, 4 pages.
Wilpon et al., "Improvements and Applications for Key Word Recognition Using Hidden Markov Modeling Techniques," IEEE 1991, 4 pages.
Yu et al., "Deep Learning with Kernel Regularization for Visual Recognition," Advances in Neural Information Processing Systems 21, Proceedings of the $22^{nd}$ Annual Conference on Neural Information Processing Systems, Dec. 8-11, 2008, 8 pages.
Zeiler et al., "On Rectified Linear Units for Speech Processing," ICASSP, p. 3517-3521, 2013, 5 pages.
Zgank A. et al., "Predicting the Acoustic Confusability Between Words for a Speech Recognition System using Levenshtein Distance," Electronics and Electrical Engineering, vol. 18 No. 8, Oct. 18, 2012, 4 pages.
Zhang et al., "Transfer Learning for Voice Activity Detection: A Denoising Deep Neural Network Perspective," INTERSPEECH2013, Mar. 8, 2013, 5 pages.
Notice of Allowance issued in U.S. Appl. No. 15/002,044, dated Feb. 5, 2018, 11 pages.
Office Action issued in U.S. Appl. No. 15/002,044, dated Oct. 6, 2016, 7 pages.
Office Action issued in U.S. Appl. No. 15/002,044, dated Apr. 13, 2017, 8 pages.
Office Action issued in U.S. Appl. No. 15/002,044, dated Aug. 25, 2017, 26 pages.
KR Office Action in Korean Appln. No. 10-2016-7027283, dated Jun. 29, 2019, 14 pages (with English translation).
IN Office Action in Indian Appln. No. 505/CHENP/2015, dated Nov. 26, 2019, 6 pages.

\* cited by examiner

DETERMINING HOTWORD SUITABILITY

CROSS-REFERENCE TO RELATED APPLICATION

This application is a continuation of U.S. application Ser. No. 15/002,044, filed Jan. 20, 2016, which is a continuation of U.S. application Ser. No. 13/567,572, filed Aug. 6, 2012, which claims the benefit of U.S. Provisional Pat. Application No. 61/667,817, filed Jul. 3, 2012, the contents of each are incorporated by reference.

BACKGROUND

The present specification relates to the determination of hotword suitability.

Hotwords, sometimes referred to as "attention words" or "wake-up words," provide a hands-free approach for a user to begin an interaction with a speech-enabled computing device. When the computing device detects that the user has spoken a hotword, the device enters a ready state for receiving further user commands. Device manufacturers and software creators generally provide predetermined hotwords to be employed by users for interacting with their devices or software applications.

SUMMARY

According to one innovative aspect of the subject matter described in this specification, a user of a mobile device may define their own hotword to be used by the mobile device. A candidate hotword may be evaluated to determine, for example, whether the candidate hotword may be easily confused by the device with another word, or whether the candidate hotword may be inappropriate for use as a hotword. A result of this evaluation is displayed to the user, who may then confirm whether they would indeed like to designate the candidate hotword as the hotword, or submit a different candidate hotword for evaluation.

As another innovative aspect of the subject matter described in this specification, a process includes receiving speech data that encodes a candidate hotword spoken by a user, evaluating the speech data or a transcription of the candidate hotword using one or more predetermined criteria, generating a hotword suitability score for the candidate hotword based on evaluating the speech data or a transcription of the candidate hotword using one or more predetermined criteria, and providing a representation of the hotword suitability score for display to the user.

Other embodiments of these aspects include corresponding systems, apparatus, and computer programs, configured to perform the actions of the methods, encoded on computer storage devices.

These and other embodiments may each optionally include one or more of the following features. For instance, the hotword suitability score reflects a suitability of the candidate hotword for use as a hotword; a hotword is a keyword or a key phrase for waking up a device; a hotword is a keyword or a key phrase for unlocking a device; a hotword is a voice password; the speech data is received from a mobile device that is operated by the user; generating a hotword suitability score includes generating, for each of two or more predetermined criteria, a feature score based on an evaluation of the speech data or of the transcription of the candidate hotword using the predetermined criteria, aggregating the feature scores, and outputting, as the hotword suitability score, the aggregated feature scores; evaluating the speech data or a transcription of the candidate hotword includes determining a word length, in frames, of the speech data, where longer word lengths are associated with higher hotword suitability scores; evaluating the speech data or a transcription of the candidate hotword includes determining a quantity of syllables or phones associated with the candidate hotword, where a larger quantity of syllables or phones is associated with a higher hotword suitability score; evaluating the speech data or a transcription of the candidate hotword includes determining an edit distance between the transcription of the candidate hotword and one or more other words that share a same language as the candidate hotword, where smaller edit distances are associated with lower hotword suitability scores; evaluating the speech data or a transcription of the candidate hotword includes determining a quantity of pronunciations specified for the candidate hotword, where fewer quantities of pronunciations are associated with higher hotword suitability scores; evaluating the speech data or a transcription of the candidate hotword includes determining that one or more particular phones occur in the transcription of the candidate hotword; the occurrence of the particular phones in the transcription is associated with a higher hotword suitability score; the occurrence of the particular phones in the transcription is associated with a lower hotword suitability score; evaluating the speech data or a transcription of the candidate hotword includes determining a quantity of training examples of the hotword that are available to a speech recognizer, where a smaller quantity of training examples is associated with a lower hotword suitability score; evaluating the speech data or a transcription of the candidate hotword includes determining an extent to which pronunciation of the candidate hotword varies among multiple utterances of the candidate hotword by the user, where a greater extent is associated with a lower hotword suitability score; the representation of the hotword suitability score includes data indicating that the candidate hotword is suitable as a hotword; the representation of the hotword suitability score includes data indicating that the candidate hotword has been accepted as a hotword; the representation of the hotword suitability score includes a color-coded representation of the hotword suitability score; and/or the representation of the hotword suitability score includes a bar, a gauge or a meter.

Advantageous implementations may include one or more of the following features. Criteria related to a candidate hotword and to a particular speaker (i.e., a device user) may be considered when evaluating the hotword. Various hotword suitability criteria may be scored and aggregated, ensuring that each criterion is considered, and that a particular criterion does not dominate during a hotword evaluation process. Device users may receive hotword suitability scores for making informed decisions when selecting hotwords for their devices. The use of suitable hotwords may improve the ability of a device to perform hotword detection, thus improving device performance and user experience. Moreover, the use of suitable hotwords may limit the potential for a "false positive" hotword detection to mistakenly activate a device, thus conserving device resources.

The details of one or more implementations are set forth in the accompanying drawings and the description below. Other potential features and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
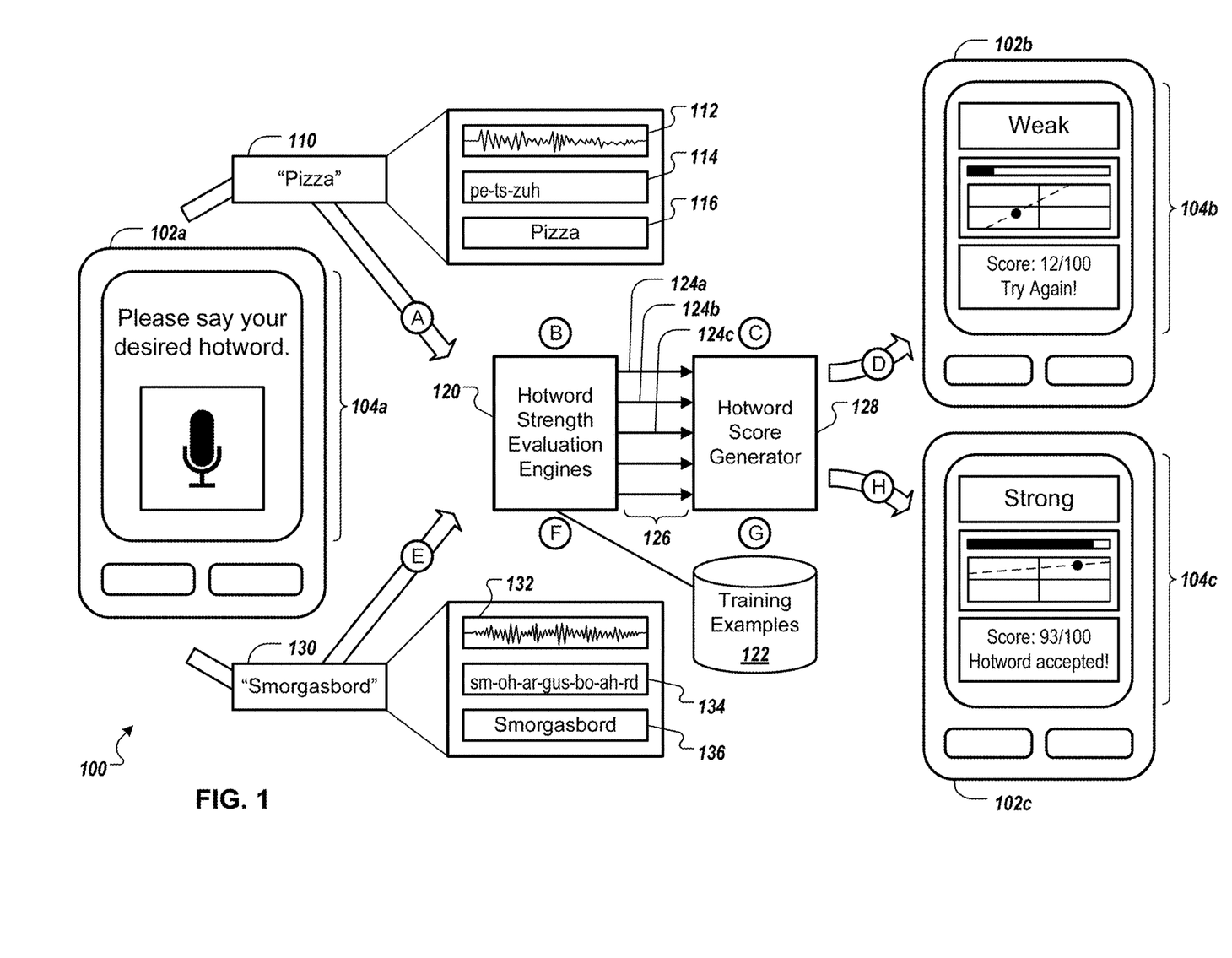
FIGS. 1 and 2 are diagrams of example systems that may determine the suitability of a spoken hotword.

FIG. 1 is a diagram of an example system 100 that may determine the suitability of a spoken hotword. FIG. 1 also illustrates an example flow of data, shown in stages (A) to (H). Stages (A) to (H) may occur in the illustrated sequence, or they may occur in a sequence that is different than in the illustrated sequence.

In general, hotword suitability may be determined by the system 100 as part of a hotword designation process. Hotwords may include keywords or key phrases spoken by users for interacting with or controlling stationary, portable, or mobile computing devices. For example, a hotword may be spoken by a user to initiate communication with a computing device, generally placing the device in a state in which it may receive further voice commands. Upon detecting a spoken hotword, for example, a computing device may perform various actions, including activation (i.e., "waking up" from a dormant or idle state), unlocking, launching a device application (e.g., a search application, a map application, etc.), loading preferred user settings, and/or other appropriate actions.

Device users may want to select particular words or phrases to serve as hotwords for their computing devices. For example, a personally meaningful word or phrase may serve to customize a device, may personalize the device in a humorous way, and may be easier for a user to remember or pronounce than a word or phrase provided by a device manufacturer. Moreover, user-selected hotwords may provide a measure of security, essentially functioning as a password. Some words or phrases, however, may be more readily detected by a computing device than others, and thus may serve as better hotwords. As will be described in examples below, hotword detectability may depend on various criteria related to a particular word or phrase and related to a particular speaker, such as the length of the word or phrase, the quantity of syllables or phones included in the word or phrase, the occurrence of particular phones, the quantity of identified pronunciations for the word or phrase, the variability of word or phrase pronunciation by the speaker, the availability of training examples for the word or phrase from various other speakers, and the edit distance between a spoken word or phrase and other words or phrases of a shared language. Each of the criteria may be scored, aggregated, and output to a user, thus providing an overall indication of the suitability of a candidate hotword. Based on hotword suitability scores, for example, users may make informed decisions when selecting hotwords for their devices.

In further detail, the system 100 includes a computing device 102 (shown here in various stages of operation as computing devices 102a, 102b, and 102c) which can present an interface 104 (shown here in various states of operation as interfaces 104a, 104b, and 104c) for display to a user. The computing device 102 includes one or more processors configured to execute instructions stored by a computer-readable medium for performing various device operations, such as input/output, communication, data processing, and the like. For example, the computing device 102 may include one or more client computing devices (e.g., desktop computers, laptop computers, notebook computers, navigation systems, smartphones, or other appropriate computing devices) and/or may include one or more servers (e.g., a backend server farm). Input received by a client computing device, for example, may be processed locally, or may be provided to a backend system (e.g., the cloud) for processing. As another example, processing may be distributed between one or more client computing devices (e.g., in a peer-to-peer configuration) and/or servers.

Referring to the example data flow, during stage (A), a user is prompted to speak or type a candidate hotword. For example, the computing device 102 (shown here as device 102a) may provide an instructional message to the user via the interface 104 (shown here as interface 102a) to "Please say your desired hotword". In the present example, the user utters the candidate hotword "pizza" and the computing device 102 captures, encodes, and/or generates speech data 110 based on the utterance.

The speech data 110, for example, may include audio source data 112 (e.g., an audio stream, a digitally sampled audio file, or another appropriate data format), a corresponding set of phones 114 (i.e., speech sounds), and optionally, a transcription 116. To identify the set of phones 114 (e.g., speech sounds detected in the user's utterance of "pizza"), for example, the computing device 102 and/or backend computing devices can analyze acoustical signals included in the audio source data 112, and can compute and classify sound features based on the analysis. Further, to generate the transcription 116 (e.g., the transcribed word "pizza"), the computing device 102 and/or backend computing devices can use speech recognition techniques (e.g., Hidden Markov models, neural networks, or other appropriate techniques) to associate the set of phones 114 with a word or phrase. Upon capturing, encoding, and/or generating the speech data 110, for example, the data may be provided to one or more hotword strength evaluation engines 120.

During stage (B), speech data is processed and evaluated. In the present example, the hotword strength evaluation engines 120 may process and evaluate the speech data 110. The hotword strength evaluation engines 120, for example, may include one or more hardware and/or software components (e.g., modules, objects, libraries, etc.) configured to process and evaluate speech data, and may be executed by one or more processors of the computing device 102 and/or other associated devices (e.g., backend servers, peer devices, etc.).

In general, various criteria may be used for evaluating speech data. Each of the criteria, for example, may be associated with a different hotword strength evaluation engine, which may in turn produce a feature score based on a particular criterion. Each of the different hotword strength evaluation engines, for example, may evaluate audio source data, derived sets of phones, transcriptions, and/or other appropriate speech data associated with a candidate hotword. Moreover, in some implementations, training examples (speech data associated with past utterances of the candidate hotword by the speaker and/or by other speakers) may be evaluated. Training examples, for example, may be maintained by a training examples data store 122. The training examples data store 122 can implement databases, data services, file systems, and the like to add, remove, and maintain data used by the system 100.

In the present example, one or more of the hotword strength evaluation engines 120 may evaluate the audio source data 112 to determine a word length in frames (i.e., a time-based section of audio). For example, the candidate hotword "pizza" may be considered to be relatively short compared to other words, or the particular speaker may happen to utter the word "pizza" relatively quickly compared to other words or other speakers. Based on a word length criterion, for example, one of the hotword strength evaluation engines 120 may produce a corresponding feature score 124a (e.g., a low score).

Continuing with the present example, one of the hotword strength evaluation engines 120 may evaluate the set of phones 114 and/or the transcription 116 to identify the edit distance, or phonetic confusability, of the candidate hotword to other words or phrases in the language of the speaker. To identify the edit distance, for example, finite state transducers, phone-to-phone transducers, and/or language models may be used to determine the most likely words or phrases that may be confused with the candidate hotword. In the present example, it may be determined that several words and phrases such as "visa", "piece of", and "beet saw" (among others) have a high likelihood of being confused with the candidate hotword "pizza". Based on an edit distance criteria, for example, one of the hotword strength evaluation engines 120 may determine that a moderate quantity of words or phrases have a small edit distance from the candidate hotword "pizza", and thus may produce a corresponding feature score 124b (e.g., a medium or low score).

Further, in the present example, one of the hotword strength evaluation engines 120 may evaluate the transcription 116 and/or data provided by the training examples data store 122 to identify a quantity of pronunciations specified for the candidate hotword. To identify possible pronunciations of the word "pizza", for example, the hotword strength evaluation engine may reference the word in a dictionary or pronunciation guide, based on the transcription 116. As another example, the hotword strength evaluation engine may reference the word "pizza" in the training examples data store 122, and may identify possible variations in how the word has been pronounced by various speakers. In the present example, it may be determined that although only one official American English pronunciation of the word "pizza" is found in the dictionary or pronunciation guide, there is some variation in how the word is pronounced by American speakers. For example, some American speakers may use a native Italian-speaker pronunciation of the word "pizza". Based on a quantity of pronunciations criteria, for example, one of the hotword strength evaluation engines 120 may determine that a low to moderate quantity of pronunciations exist for the candidate hotword "pizza", and thus may produce a corresponding feature score 124c (e.g., a high or medium score).

During stage (C), a hotword suitability score is generated. Upon generating each of the feature scores 124a, 124b, and 124c, for example, a set of feature scores 126 may be provided to a hotword score generator 128. The hotword score generator 128, for example, may aggregate the scores 124a, 124b, and 124c and provide the aggregated feature scores as a hotword suitability score. To generate the hotword suitability score, for example, the hotword score generator 128 may use logistic regression or an alternative classifier to train a model that estimates a confidence value for the candidate hotword (e.g., the word "pizza"). In general, a high confidence value may be associated with a potentially suitable hotword. As another example, the hotword score generator may assign appropriate weights (e.g., based on empirical analysis) to each of the feature scores 124a, 124b, and 124c, and may perform an aggregation operation.

During stage (D), a representation of the hotword suitability score is provided for display to the user. For example, the computing device 102 (shown here as device 102b) may provide one or more indications (e.g., visual and/or audio) of hotword suitability to the user via the interface 104 (shown here as interface 104b). In the present example, the interface 104b may present to the user a message (e.g., the candidate hotword "pizza" is relatively "weak"), and one or more textual or graphical representations (e.g., line graphs, bar graphs, quadrant charts, etc.) of feature and/or aggregate scores associated with the various hotword scoring criteria (e.g., an aggregate hotword suitability score of 12/100). Moreover, in the present example, the user may be presented with a prompt to submit another candidate hotword (e.g., to "try again"). The prompt may be provided, for example, if the hotword suitability score is under a predetermined threshold.

Referring again to the example data flow, similar to stage (A), during stage (E), the user is again prompted to provide a candidate hotword. In the present example, the user utters the candidate hotword "smorgasbord" and the computing device 102 captures, encodes, and/or generates speech data 130 based on the utterance. Similar to the speech data 110, for example, the speech data 130 may include audio source data 132, a corresponding set of phones 134, and optionally, a transcription 136. Upon capturing, encoding, and/or generating the speech data 130, for example, the data may be provided to one or more hotword strength evaluation engines 120.

Similar to stage (B), during stage (F), speech data is processed and evaluated. In the present example, the hotword strength evaluation engines 120 may process and evaluate the speech data 130. The hotword strength evaluation engines 120, for example, may evaluate the audio source data 132, the set of phones 134, the transcription 136, and other appropriate speech data associated with the candidate hotword "smorgasbord".

In the present example, one of the hotword strength evaluation engines 120 may evaluate the audio source data 132 to determine a word length in frames. For example, the candidate hotword "smorgasbord" may be considered to be relatively long compared to other words (e.g., based on an average word length), or the particular speaker may happen to utter the word "pizza" relatively slowly compared to other words or other speakers. Based on a word length criterion, for example, one of the hotword strength evaluation engines 120 may produce a corresponding feature score 124a (e.g., a high score).

Continuing with the present example, one of the hotword strength evaluation engines 120 may evaluate the set of phones 134 and/or the transcription 136 to identify the edit distance of the candidate hotword to other words or phrases in the language of the speaker. In the present example, it may be determined that the word "harpsichord" has a remote possibility of being confused with the candidate hotword "smorgasbord". Based on an edit distance criteria, for example, one of the hotword strength evaluation engines 120 may determine that a small quantity of words or phrases have a moderate edit distance from the candidate hotword "smorgasbord", and thus may produce a corresponding feature score 124b (e.g., a high score).

Further, in the present example, one of the hotword strength evaluation engines 120 may evaluate the transcription 136 and/or data provided by the training examples data store 122 to identify a quantity of pronunciations specified for the candidate hotword. Similar to the word "pizza", for example, it may be determined that although only one official American English pronunciation of the word "smorgasbord" is found in a dictionary or pronunciation guide, there is some variation in how the word is pronounced by American speakers. For example, some American speakers may use a Swedish pronunciation of the word "smorgasbord". Based on a quantity of pronunciations criteria, for example, one of the hotword strength evaluation engines 120 may determine that a low to moderate quantity of pronunciations exist for the candidate hotword "smorgasbord", and thus may produce a corresponding feature score 124c (e.g., a high or medium score).

Similar to stage (C), during stage (G), a hotword suitability score is generated. Upon generating each of the feature scores 124a, 124b, and 124c for the speech data 130, for example, a set of feature scores 126 may be provided to the hotword score generator 128. Further, similar to stage (D), during stage (H), a representation of the hotword suitability score is provided for display to the user. In the present example, the interface 104 (shown here as interface 104c) may present to the user a message (e.g., the candidate hotword "smorgasbord" is relatively "strong"), and one or more textual or graphical representations of feature and/or aggregate scores associated with the various hotword scoring criteria (e.g., an aggregate hotword suitability score of 93/100). Moreover, in the present example, the user may be presented with a message that a candidate hotword is designated as a device hotword (e.g., the hotword is "accepted"). The message may be provided, for example, if the hotword suitability score is over a predetermined threshold.

As described in the preceding examples, both criteria related to a candidate hotword and to a particular speaker may be considered when evaluating a hotword. The device user may review hotword suitability information provided by the computing device 102 to select a hotword. The use of suitable hotwords may improve hotword detection by the device, thus improving device performance and conserving device resources. Several criteria for evaluating speech data and for generating hotword suitability scores have been described in the preceding examples. However, as will be described in further examples below, additional criteria, fewer criteria, and/or different criteria may be considered.

Figure 2:
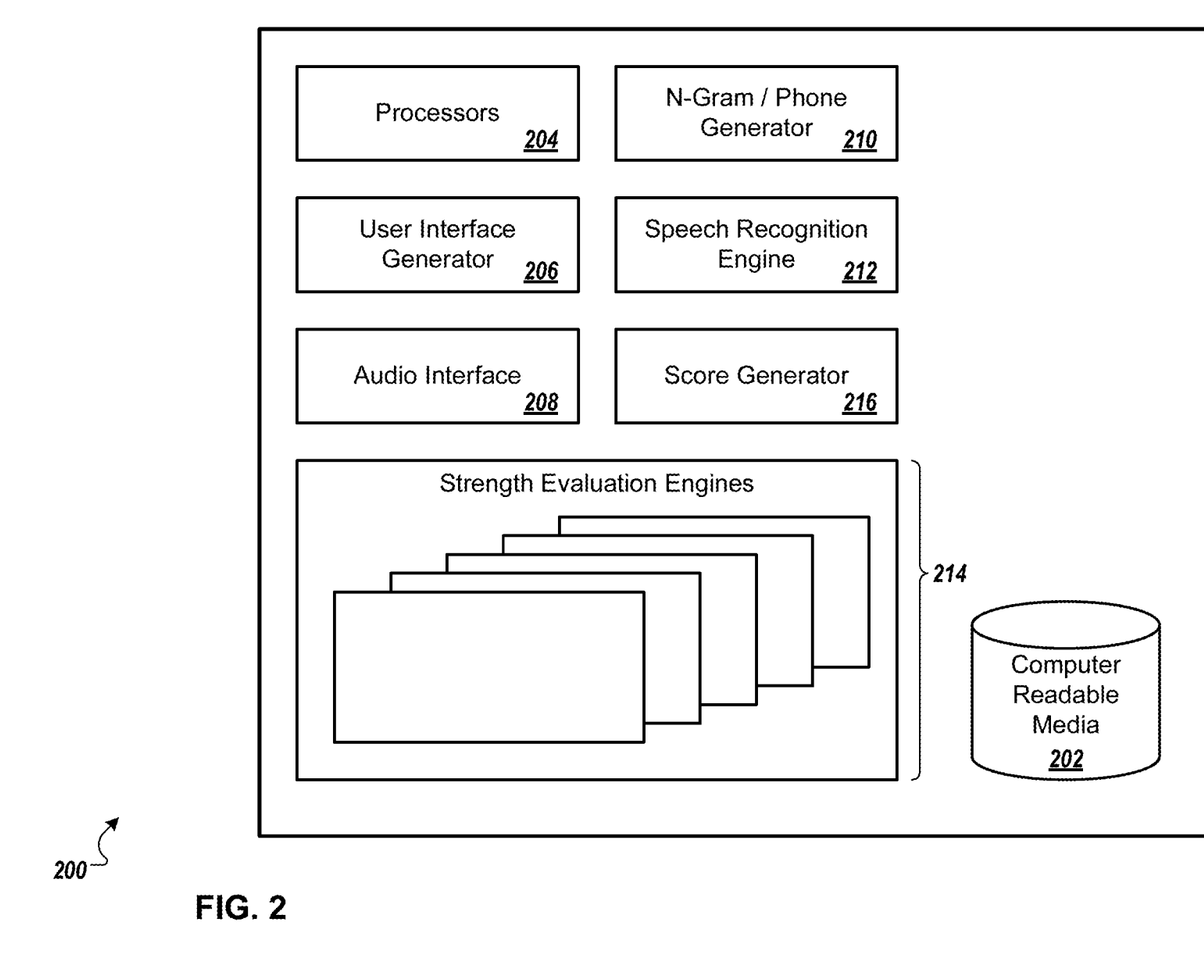

FIG. 2 is a diagram of an example system 200 that may determine the suitability of a spoken hotword. The system 200, for example, may include hardware and/or software components of one or more client computing devices and/or backend servers. In general, the system 200 can receive speech data that encodes a candidate hotword spoken by a user, can evaluate and transcribe the speech data, can generate a hotword suitability score for the candidate hotword, and can provide a representation of the hotword suitability score for display to the user.

The system 200 may include computer-readable media 202 (e.g., one or more floppy disk devices, hard disk devices, optical disk devices, tape devices, flash memory devices or other similar solid state memory device, or an array of devices) for storing instructions (e.g., application program code) for performing the processes described herein. Further, the system 200 may include one or more processors 204 configured to execute the instructions and to perform various device operations, such as input/output, communication, data processing, and the like.

The system 200 may include a user interface generator 206 for providing an interface (e.g., graphical, audio, and/or tactile) interface between the system 200 and a user. For example, the user interface generator 206 can provide the interfaces 104a, 104b, and 104c (shown in FIG. 1) for providing prompts, messages, and representations of hotword suitability to the user. Further, the system 200 may include an audio interface 208. The audio interface 208, for example, may include one or more microphones for receiving spoken words and phrases from the user, and one or more speakers for providing audio prompts and feedback (e.g., tones, recordings, computer-generated speech, etc.) to the user. Moreover, the audio interface 208 may provide audio signals associated with received spoken words and phrases to the processors 204 for digital sampling and encoding.

The system 200 may include an n-gram/phone generator 210. For example, the n-gram/phone generator 210 may analyze encoded speech data provided via the audio interface 208 and the processors 204, and may identify a corresponding series of n-grams and/or phones. The n-grams and/or phones, for example, may be used by a speech recognition engine 212 to perform machine translation and transcription.

The system 200 may include a plurality of hotword strength evaluation engines 214. Various predetermined criteria may be considered by the hotword strength evaluation engines 214 for evaluating speech data. For example, criteria may include the length of a word or phrase, the quantity of syllables or phones included in the word or phrase, the occurrence of particular phones, the quantity of identified pronunciations for the word or phrase, the variability of word or phrase pronunciation by the speaker, the availability of training examples for the word or phrase from various speakers, and/or the edit distance between a spoken word or phrase and other words or phrases of a shared language. Each of the hotword strength evaluation engines 214, for example, may evaluate speech data using one or more of the criteria.

The system 200 may include a score generator 216. For example, a feature score may be determined by the score generator 216 for each of the hotword strength evaluation engines 214, and an overall hotword suitability score may be determined by aggregating the feature scores. A representation of the hotword suitability score may be provided to the user, for example, via an interface generated by the user interface generator 206.

Figure 3:
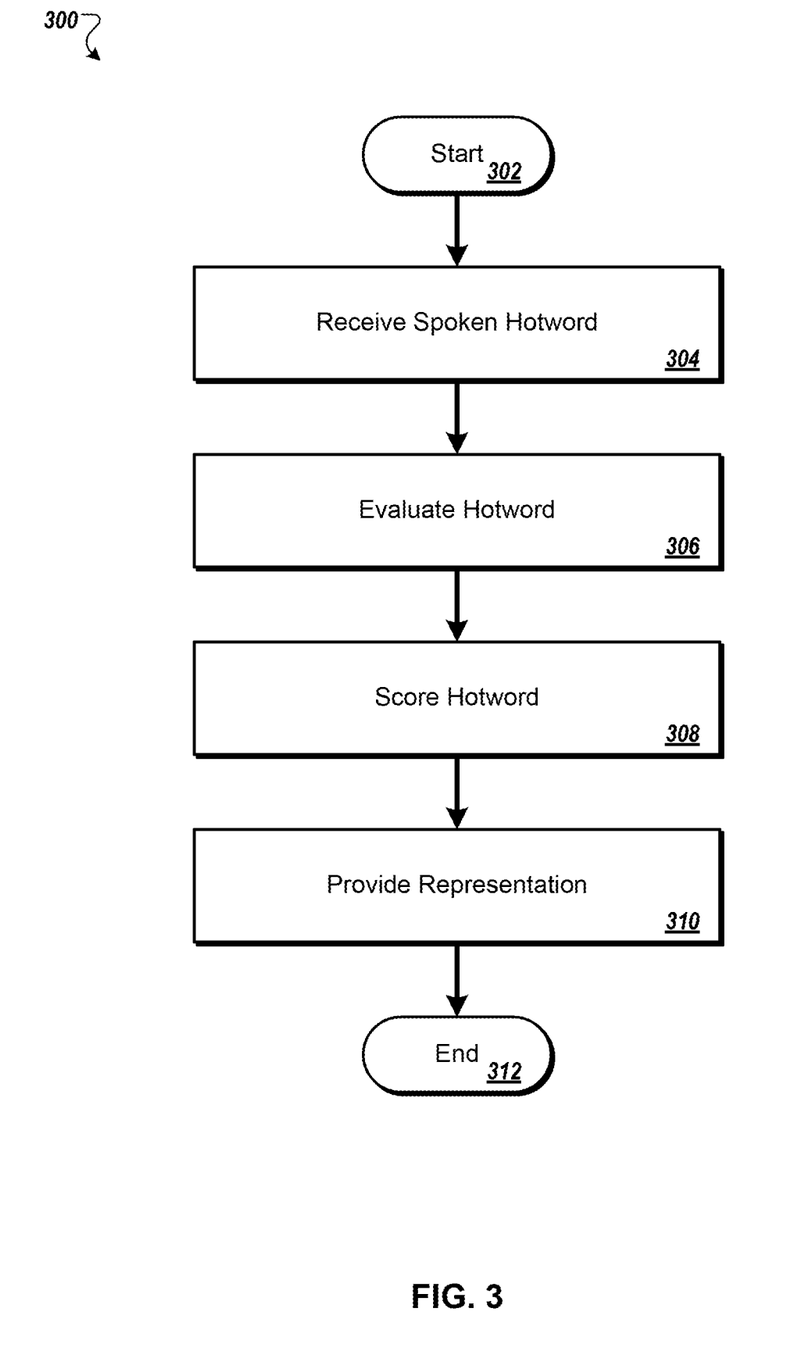
FIG. 3 is a flow chart illustrating an example process for determining the suitability of a spoken hotword and for providing a representation of the suitability.

FIG. 3 is a flow chart illustrating an example process 300 for determining the suitability of a spoken hotword and for providing a representation of the suitability. In some implementations, the process 300 may be performed by the systems 100 and/or 200, and will be described as such for clarity. Briefly, the process 300 includes receiving a spoken hotword, evaluating the hotword, scoring the hotword, and providing a representation of the hotword's suitability.

In more detail, when the process 300 begins (302), speech data that encodes a candidate hotword spoken by a user is received (304). The user, for example, may want to provide a keyword or key phrase for waking up and/or unlocking his or her stationary device (e.g., a home automation system) or mobile device (e.g., a smartphone). In the present example, the user may choose to provide a phrase that is memorable for the user, yet unlikely to be conceived of by other users (i.e., a voice password). Thus, the user in the present example utters the phrase "pizza smorgasbord".

Referring to FIG. 2, for example, the audio interface 208 can receive the candidate hotword uttered by the user and can provide audio signals associated with the received utterance to the processors 204 for digital sampling and encoding. Further, the sampled and encoded audio signals can be decomposed into a series of n-grams and phones by the n-gram/phone generator 210, and can be transcribed by the speech recognition engine 212. The speech data and the transcription, for example, may be provided to the hotword strength evaluation engines 214.

The speech data, or a transcription of the candidate hotword, is evaluated (306), using one or more predetermined criteria. For example, each of the hotword strength evaluation engines 214 may be configured to evaluate the speech data and/or the transcription based on a particular criterion, or a set of related criteria. In general, hotword features or characteristics that may be related to hotword detection performance may be extracted and evaluated.

In some implementations, evaluating the speech data and/or a transcription of the candidate hotword may include determining a word length (e.g., in frames) of the speech data. For example, a framing process may be used to divide a speech signal associated with a candidate hotword into shorter speech signals, thereby identifying relatively stable frequency characteristics. In general, longer word lengths (e.g., a larger quantity of frames) may be associated with higher hotword suitability scores. In the present example, the candidate hotword "pizza smorgasbord" may be relatively long in comparison to a typical hotword, and may be associated with a relatively high hotword suitability score when considering a word length feature.

In some implementations, evaluating the speech data and/or a transcription of the candidate hotword may include determining a quantity of syllables or phones associated with the candidate hotword. For example, a quantity of syllables associated with a candidate hotword may be determined by using a transcription of the hotword generated by the speech recognition engine 212 to reference a dictionary including syllable counts for various words. As another example, a quantity of phones associated with a candidate hotword may be determined by evaluating a set of phones identified for the hotword by the n-gram/phone generator 210. In the present example, the candidate hotword "pizza smorgasbord" may be identified as including five syllables in total (e.g., two syllables for the individual word "pizza" and three syllables for the word "smorgasbord"), and may be identified as including ten phones in total (e.g., three phones for the individual word "pizza" and seven phones for the word "smorgasbord"). In general, a larger quantity of syllables or phones may be associated with a higher hotword suitability score. The candidate hotword "pizza smorgasbord" in the present example may have a relatively large quantity of syllables and/or phones in comparison to a typical hotword, and may be associated with a relatively high hotword suitability score when considering a syllable and/or phone quantity feature.

In some implementations, evaluating the speech data and/or a transcription of the candidate hotword may include determining an edit distance between the transcription of the candidate hotword and one or more other words that share a same language as the candidate hotword. Words or phrases having a small edit distance between each other, for example, may generally be confusable with each other, whereas words or phrases having a large edit distance between each other may generally be more easily distinguished. In the present example, it may be determined that the phrase "piece of harpsichord" may have a moderate edit distance from (i.e., may be somewhat confusable with) the candidate hotword "pizza smorgasbord". In general, smaller edit distances may be associated with lower hotword suitability scores. Thus, in the present example, as the phrases "piece of harpsichord" and "pizza smorgasbord" have a moderate edit distance between them, the candidate hotword may be associated with a moderate hotword suitability score when considering an edit distance feature.

Upon identifying one or more words or phrases that are within a predetermined edit distance range of the candidate hotword, in some implementations the quantity of such words may be considered when determining an edit distance feature score. For example, the phrase "piece of harpsichord" may have been identified as being within a predetermined edit distance range from the candidate hotword "pizza smorgasbord", but only a few (if any) other phrases may have also been identified as being within the edit distance range. Thus, in the present example, the candidate hotword may be associated with a higher feature score. Further, in some implementations, the likelihoods of a candidate hotword and/or each of the words or phrases that are within the predetermined edit distance range of the candidate hotword (i.e., potentially confusable words or phrases) being used in general conversation may be considered when determining a hotword suitability score. For example, or more of the candidate evaluation engines 214 may determine that the likelihood of the candidate hotword "pizza smorgasbord" and/or the potentially confusable phrase "piece of harpsichord" being spoken in general conversation (e.g., by the device user, and/or by people in general) is relatively low, and the candidate hotword may be associated with an even feature higher score.

In some implementations, evaluating the speech data and/or a transcription of the candidate hotword may include determining a quantity of pronunciations specified for the candidate hotword. For example, a quantity of pronunciations associated with a candidate hotword may be determined by using a transcription of the hotword generated by the speech recognition engine 212 to reference a dictionary including common or accepted pronunciations of the hotword. As another example, recorded instances of the user and/or other users having spoken the candidate hotword may be evaluated. In general, fewer quantities of pronunciations may be associated with higher hotword suitability scores. For example, one of the hotword strength evaluation engines 214 may identify a single official pronunciation of the phrase "pizza smorgasbord" from a dictionary source, but may identify a small to medium quantity of different pronunciations of the phrase by a population of speakers. Thus, in the present example, the candidate hotword "pizza smorgasbord" may be associated with a relatively high to medium hotword suitability score when considering a quantity of pronunciations feature.

In some implementations, evaluating the speech data and/or a transcription of the candidate hotword may include determining that one or more particular phones or syllables occur in the transcription of the candidate hotword. To identify the particular syllables, for example, a transcription of the candidate hotword may be used to reference a dictionary or pronunciation guide, and the defined syllables associated with the hotword may be identified. As another example, one of the hotword strength evaluation engines 214 may evaluate phones identified for a spoken candidate hotword by the n-gram/phone generator 210. In general, the occurrence of certain phones or syllables in the transcription may be associated with a higher hotword suitability score. For example, the second syllable of the word "pizza" (i.e., "suh") included in the phrase "pizza smorgasbord" may be associated with a high detectability confidence level, and a relatively high hotword suitability. However, the occurrence of certain other phones in the transcription may generally be associated with a lower hotword suitability score. For example, the first syllable of the word "pizza" (i.e., "peet")

may be associated with a low detectability confidence level (e.g., it may be confusable with the syllable "beet"), and a relatively low hotword suitability. Upon determining and evaluating the particular phones or syllables that occur in a candidate hotword, for example, the constituent scores associated with each phone or syllable may be used for determining an aggregated score. For example, the candidate hotword "pizza smorgasbord" may include particular phones or syllables associated with low, medium, and high scores. Thus, the candidate hotword in the present example may be associated with a medium hotword suitability score when considering particular phone and/or syllable features.

In some implementations, evaluating the speech data and/or a transcription of the candidate hotword may include determining a quantity of training examples of the hotword that are available to a speech recognizer. Referring to FIG. 1, for example, recorded instances of various individuals (e.g., the device user and/or other users) having spoken various words and phrases may maintained by the training examples data store 122. Moreover, the training examples data store 122 may include transcription and/or index data, for example, so recorded instances of particular words and/or phrases may be referenced and analyzed. In general, a smaller quantity of training examples may be associated with a lower hotword suitability score. The candidate hotword "pizza smorgasbord" in the present example may have a relatively small quantity of training examples in comparison to a typical hotword, and may be associated with a relatively low hotword suitability score when considering a quantity of training examples feature.

If no training examples are found for a particular candidate hotword, in some implementations a nearest neighbor hotword (e.g., a word or phrase associated with similar phones, syllables, or other appropriate features) may be evaluated. For example, a user may choose to provide an invented word (i.e., a word that does not exist in a dictionary) as a candidate hotword. In the present example, as training examples may be unavailable for the invented candidate hotword, a training examples feature score for the hotword may be low, but other feature scores may be relatively high, thus offsetting the low feature score when determining an aggregate hotword suitability score. For example, a particular invented word may include one or more syllables or phones that are associated with high feature scores, and the invented word may be associated with a high score when considering an edit distance feature.

In some implementations, evaluating the speech data and/or a transcription of the candidate hotword may include determining an extent to which pronunciation of the candidate hotword varies among multiple utterances of the candidate hotword by the user. Referring to FIG. 1, for example, the user may prompted by the computing device 102a to "please say your desired hotword" multiple times, and the various instances of the spoken hotword (e.g., the associated audio signals) may be compared with each other for consistency by one or more of the hotword strength evaluation engines 120. In the present example, the user may be somewhat inconsistent when pronouncing the candidate hotword "pizza smorgasbord"—the phrase may be difficult for the particular speaker to pronounce consistently. In general, a greater pronunciation variation extent may be associated with a lower hotword suitability score. Thus, in the present example, the candidate hotword "pizza smorgasbord" may be associated with a relatively low hotword suitability score when considering a pronunciation variation feature.

Various possible hotword features, criteria for evaluating speech data, and techniques for generating hotword suitability scores have been described in the preceding examples. However, additional, fewer, and/or different features, criteria, and/or techniques may be employed. In general, classifiers may be trained to identify and consider potentially influential features and criteria related to speech data. Moreover, techniques for generating hotword suitability scores may change over time as additional speech data (e.g., training examples) are considered.

A hotword suitability score for the candidate hotword is generated (308), based on evaluating the speech data, or a transcription of the candidate hotword, using one or more predetermined criteria (e.g., the criteria described in the preceding examples). The hotword suitability score may reflect a suitability of the candidate hotword for use as a hotword. For example, a high hotword suitability score may be associated with a candidate hotword that is likely to perform well when used to activate a computing device, whereas a low hotword suitability score may be associated with a candidate hotword that is likely to perform poorly. Well performing hotwords, for example, may be readily detectible and unlikely to be confused with natural language conversation. Poorly performing hotwords, for example, may be difficult for a computing device to detect and may be likely to be confused with other words and phrases.

In some implementations, generating a hotword suitability score may include generating, for each of two or more predetermined criteria, a feature score based on an evaluation of the speech data (or of the transcription of the candidate hotword) using the predetermined criteria, aggregating the feature scores, and outputting, as the hotword suitability score, the aggregated feature scores. In the present example, the candidate hotword "pizza smorgasbord" may be associated with high or medium feature scores for a word length criterion, a quantity of syllables or phones criterion, an edit distance criterion, a quantity of pronunciations criterion, and an occurrence of particular phones or syllables criterion. However, the candidate hotword "pizza smorgasbord" in the present example may also be associated with low feature scores for a quantity of training examples criterion and for a pronunciation variation criterion. An aggregate hotword suitability score, for example, may depend on how weights may be applied to the various feature scores, and/or may depend on how classifiers for generating the scores are trained. In the present example, the candidate hotword "pizza smorgasbord" may be associated with a medium to high hotword suitability score.

A representation of the hotword suitability score is provided (310) for display to the user, thereby ending the process (312). Referring to FIG. 1, for example, the interfaces 104b and 104c are shown for displaying representations of hotword suitability scores to users. The interface 104b, for example, shows a representation of a hotword suitability score where the representation includes data indicating that the candidate hotword is unsuitable as a hotword, and that the candidate hotword has been rejected. The interface 104c, for example, shows a representation of a hotword suitability score where the representation includes data indicating that the candidate hotword is suitable as a hotword, and that the candidate hotword has been accepted. However, in some implementations, hotword suitability scores may serve as general information about how well hotwords are predicted to perform on a computing device, and a user may choose to act upon or to ignore the information.

Various representations (e.g., visual and/or audio) of a hotword suitability score may be provided to the user. In some implementations, a text score (e.g., a ten point scale, a hundred point scale, a letter grade, etc.) may be provided. For example, an interface may display the letter grade "B+" for the candidate hotword "pizza smorgasbord". In some implementations, a representation of a hotword suitability score may include a color-coded representation of the score. Similar to a traffic light, for example, the color green may be associated with high suitability scores, the color yellow may be associated with medium suitability scores, and the color red may be associated with low suitability scores. In some implementations, a representation of a hotword suitability score may include a bar, a gauge, or a meter. A high overall suitability score, for example, may be represented with a proportionally high (or long) bar indicator. As another example, each of the individual feature scores included in an aggregate hotword suitability score may be represented by a separate bar, gauge, or meter. Thus, in the present example, if the user is informed that the candidate hotword "pizza smorgasbord" has received relatively high scores for most features, with the exception of a training example criterion and a pronunciation variation criterion, he or she may use the information to improve the candidate hotword (e.g., by providing more training examples and/or a clearer pronunciation), or to select a different candidate hotword.

Figure 4:
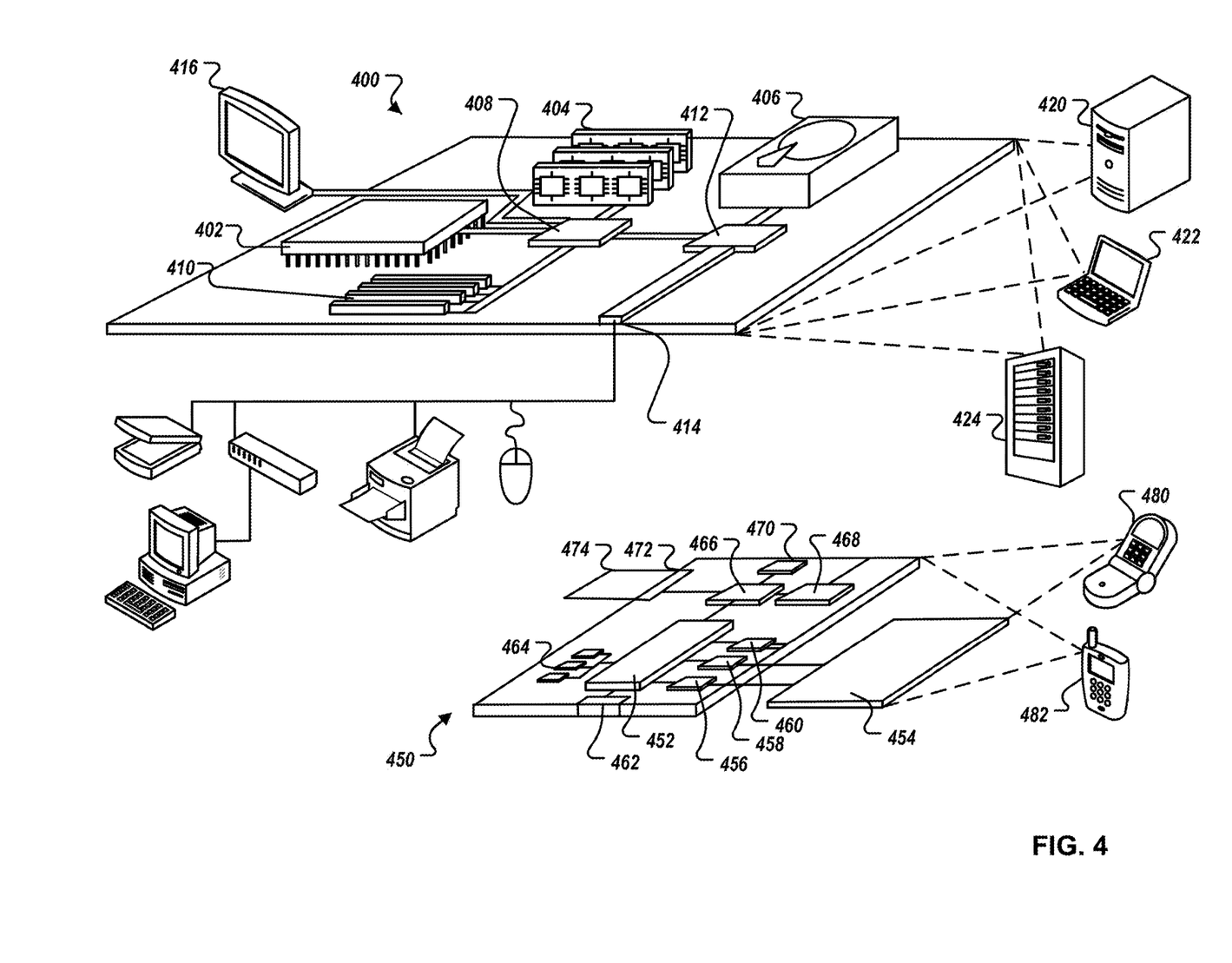
FIG. 4 shows an example of a generic computer device and a generic mobile computer device.

FIG. 4 shows an example of a generic computer device 400 and a generic mobile computer device 450, which may be used with the techniques described here. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 may process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 404, the storage device 406, memory on processor 402, or a propagated signal.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 may execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 may be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, memory on processor 452, or a propagated signal that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method performed by one or more computing devices:
   receiving, by the one or more computing devices, speech data that encodes an utterance of a candidate hotword by a user, the candidate hotword comprising a word or phrase;
   evaluating, by the one or more computing devices, the speech data or a transcription of the speech data using one or more hotword suitability criteria;
   determining, by the one or more computing devices and based on the evaluation, that the candidate hotword satisfies the one or more hotword suitability criteria; and
   in response to determining that the candidate hotword satisfies the one or more hotword suitability criteria, accepting the candidate hotword as a hotword for at least one computing device associated with the user and configuring the at least one computing device to enter a state to receive voice commands in response to utterances of the hotword.

2. The method of claim 1, wherein evaluating the speech data or a transcription of the speech data comprises determining a hotword suitability score for the candidate hotword; and
   wherein determining that the candidate hotword satisfies the one or more hotword suitability criteria comprises determining that the hotword suitability score satisfies a predetermined threshold.

3. The method of claim 2, wherein determining a hotword suitability score for the candidate hotword comprises:
   generating a feature score for the speech data or of a transcription of the speech data, for each of two or more predetermined criteria;
   aggregating the feature scores; and
   generating a hotword suitability score based on the aggregated feature scores.

4. The method of claim 1, wherein evaluating the speech data or a transcription of the speech data comprises evaluating a length of the speech data representing the utterance of the candidate hotword.

5. The method of claim 1, wherein evaluating the speech data or a transcription of the speech data comprises evaluating a quantity of syllables or phones in a representation of the candidate hotword.

6. The method of claim 1, wherein evaluating the speech data or a transcription of the speech data comprises evaluating an edit distance between the transcription of the candidate hotword and one or more other words that share a same language as the candidate hotword.

7. The method of claim 1, wherein evaluating the speech data or a transcription of the speech data comprises evaluating a quantity of pronunciations specified for the candidate hotword.

8. The method of claim 1, wherein evaluating the speech data or a transcription of the speech data comprises determining that one or more particular linguistic units occur in the transcription of the speech data.

9. The method of claim 1, wherein evaluating the speech data or a transcription of the speech data comprises evaluating an extent to which pronunciation of the candidate hotword varies among multiple utterances of the candidate hotword by the user.

10. A system comprising:
    one or more computing devices; and
    one or more computer-readable media storing instructions that, when executed by the one or more computing devices, cause the one or more computing devices to perform operations comprising:
      receiving, by the one or more computing devices, speech data that encodes an utterance of a candidate hotword by a user, the candidate hotword comprising a word or phrase;
      evaluating, by the one or more computing devices, the speech data or a transcription of the speech data using one or more hotword suitability criteria;
      determining, by the one or more computing devices and based on the evaluation, that the candidate hotword satisfies the one or more hotword suitability criteria; and
      in response to determining that the candidate hotword satisfies the one or more hotword suitability criteria, accepting the candidate hotword as a hotword for at least one computing device associated with the user and configuring the at least one computing device to enter a state to receive voice commands in response to utterances of the hotword.

11. The system of claim 10, wherein evaluating the speech data or a transcription of the speech data comprises determining a hotword suitability score for the candidate hotword; and
    wherein determining that the candidate hotword satisfies the one or more hotword suitability criteria comprises determining that the hotword suitability score satisfies a predetermined threshold.

12. The system of claim 11, wherein determining a hotword suitability score for the candidate hotword comprises:
    generating a feature score for the speech data or of a transcription of the speech data, for each of two or more predetermined criteria;
    aggregating the feature scores; and
    generating a hotword suitability score based on the aggregated feature scores.

13. The system of claim 10, wherein evaluating the speech data or a transcription of the speech data comprises evaluating a length of the speech data representing the utterance of the candidate hotword.

14. A method performed by one or more computing devices:
    receiving, by the one or more computing devices, speech data that encodes an utterance of a candidate hotword by a user, the candidate hotword comprising a word or phrase;
    evaluating, by the one or more computing devices, the speech data or a transcription of the speech data using one or more hotword suitability criteria;
    determining, by the one or more computing devices and based on the evaluation, that the candidate hotword does not satisfy the one or more hotword suitability criteria; and
    in response to determining that the candidate hotword does not satisfy the one or more hotword suitability criteria, providing, for output by a computing device associated with the user, an indication that the candidate hotword is not accepted as a custom hotword.

15. The method of claim 14, wherein evaluating the speech data or a transcription of the speech data comprises determining a hotword suitability score for the candidate hotword; and wherein determining that the candidate hotword does not satisfy the one or more hotword suitability criteria comprises determining that the hotword suitability score does not satisfy a predetermined threshold.

16. The method of claim 15, wherein determining a hotword suitability score for the candidate hotword comprises:

generating a feature score for the speech data or of a transcription of the speech data, for each of two or more predetermined criteria;

aggregating the feature scores; and generating a hotword suitability score based on the aggregated feature scores.

17. The method of claim 14, wherein evaluating the speech data or a transcription of the speech data comprises evaluating a length of the speech data representing the utterance of the candidate hotword.

18. The method of claim 14, wherein evaluating the speech data or a transcription of the speech data comprises evaluating a quantity of syllables or phones in a representation of the candidate hotword.

19. The method of claim 14, wherein evaluating the speech data or a transcription of the speech data comprises evaluating an edit distance between the transcription of the candidate hotword and one or more other words that share a same language as the candidate hotword.

20. The method of claim 14, wherein evaluating the speech data or a transcription of the speech data comprises evaluating a quantity of pronunciations specified for the candidate hotword.

21. A system comprising:

one or more computing devices; and one or more computer-readable media storing instructions that, when executed by the one or more computing devices, cause the one or more computing devices to perform operations comprising:

receiving, by the one or more computing devices, speech data that encodes an utterance of a candidate hotword by a user, the candidate hotword comprising a word or phrase;

evaluating, by the one or more computing devices, the speech data or a transcription of the speech data using one or more hotword suitability criteria;

determining, by the one or more computing devices and based on the evaluation, that the candidate hotword does not satisfy the one or more hotword suitability criteria; and in response to determining that the candidate hotword does not satisfy the one or more hotword suitability criteria, providing, for output by a computing device associated with the user, an indication that the candidate hotword is not accepted as a custom hotword.

* * * * *